United States Patent
Nakamura et al.

(10) Patent No.: US 12,478,371 B2
(45) Date of Patent: Nov. 25, 2025

(54) MEDICAL STAPLER

(71) Applicants: OLYMPUS CORPORATION, Tokyo (JP); National Cancer Center, Tokyo (JP)

(72) Inventors: Takashi Nakamura, Hachioji (JP); Hiroyuki Takayama, Hachioji (JP); Satoru Nonaka, Tokyo (JP); Ichiro Oda, Tokyo (JP); Seiichiro Abe, Tokyo (JP)

(73) Assignees: National Cancer Center, Tokyo (JP); OLYMPUS CORPORATION, Tokyo (JP)

( * ) Notice: Subject to any disclaimer, the term of this patent is extended or adjusted under 35 U.S.C. 154(b) by 255 days.

(21) Appl. No.: 18/337,648

(22) Filed: Jun. 20, 2023

(65) Prior Publication Data

US 2023/0329706 A1    Oct. 19, 2023

Related U.S. Application Data

(63) Continuation of application No. PCT/JP2020/048456, filed on Dec. 24, 2020.

(51) Int. Cl.
*A61B 17/068* (2006.01)
*A61B 17/00* (2006.01)

(52) U.S. Cl.
CPC ...... *A61B 17/068* (2013.01); *A61B 2017/003* (2013.01); *A61B 2017/00358* (2013.01)

(58) Field of Classification Search
CPC .............. A61B 17/068; A61B 17/1114; A61B 2017/00296; A61B 2017/00818;
(Continued)

(56) References Cited

U.S. PATENT DOCUMENTS

| 5,395,030 A | 3/1995 | Kuramoto et al. |
| 2002/0063143 A1* | 5/2002 | Adams ................ A61B 17/072 227/180.1 |

(Continued)

FOREIGN PATENT DOCUMENTS

| JP | 06047050 A | 2/1994 |
| JP | 11506943 A | 6/1999 |

(Continued)

OTHER PUBLICATIONS

"International Application Serial No. PCT/JP2020/048456, International Search Report dated Mar. 9, 2021", w/ English Translation, (Mar. 9, 2021), 4 pgs.

*Primary Examiner* — Diane D Yabut
(74) *Attorney, Agent, or Firm* — Schwegman Lundberg & Woessner, P.A.

(57) ABSTRACT

A medical stapler includes an attachment-detachment portion attached to a distal-end portion of an endoscope and including an opening from which an objective lens of the endoscope is exposed; and a grasping portion attached to the attachment-detachment portion and including a first grasping portion and a second grasping portion connected by a rotation shaft to be openable and closeable, wherein the second grasping portion includes a visual-field space penetrating a gap between the staple reception portion and the rotation shaft in an open-close direction, when the grasping portion is in the closed state, the staple extraction portion and the staple reception portion are opposite to each other, and when the grasping portion is in an open state, an optical axis of the objective lens passes through the visual-field space.

13 Claims, 10 Drawing Sheets

(58) Field of Classification Search
CPC .... A61B 2017/07214; A61B 2017/07257; A61B 2017/07271; A61B 1/00101
See application file for complete search history.

(56) References Cited

U.S. PATENT DOCUMENTS

2002/0173786 A1* 11/2002 Kortenbach ............ A61B 10/06
 606/49
2021/0022733 A1* 1/2021 Smith ................. A61B 17/072

FOREIGN PATENT DOCUMENTS

| JP | 2004503325 A | 2/2004 |
| WO | WO-9618344 A2 | 6/1996 |
| WO | WO-0205721 A2 | 1/2002 |

* cited by examiner

MEDICAL STAPLER

The present application is a continuation application of PCT International Application No. PCT/JP2020/048456, filed on Dec. 24, 2020. The content of the above-identified PCT International Applications is incorporated herein by reference.

TECHNICAL FIELD

The present disclosure relates to a medical stapler.

BACKGROUND ART

In recent years, in operations to suture the gastrointestinal tract or the like, a medical stapler such as a stapler or the like is used. It is possible to facilitate the operations to suture the gastrointestinal tract or the like and significantly shorten the operation period by using the suitable medical stapler.

A full-thickness resection system disclosed in Published Japanese Translation No. 2004-503325 of the PCT International Publication includes an endoscope and a stapling mechanism arranged in the surrounding of the endoscope. The full-thickness resection system is configured to observe the treatment target by the endoscope while performing the suturing treatment with respect to the treatment target by the stapling mechanism.

SUMMARY

According to an aspect of the present disclosure, a medical stapler includes an attachment-detachment portion attached to a distal-end portion of an endoscope and including an opening from which an objective lens of the endoscope is exposed; and a grasping portion attached to the attachment-detachment portion and including a first grasping portion and a second grasping portion connected by a rotation shaft to be openable and closeable, wherein a staple extraction portion provided in the first grasping portion and a staple reception portion provided in the second grasping portion are opposite to each other when the grasping portion is in a closed state, wherein the second grasping portion includes a visual-field space penetrating a gap between the staple reception portion and the rotation shaft in an open-close direction, when the grasping portion is in the closed state, the staple extraction portion and the staple reception portion are opposite to each other, and when the grasping portion is in an open state, an optical axis of the objective lens passes through the visual-field space.

BRIEF DESCRIPTION OF DRAWINGS

FIG. 6 is a side view showing the medical stapler in which the grasping portion is in the closed state.

DESCRIPTION OF EMBODIMENTS

First Embodiment

A first embodiment of the present disclosure will be described referring from FIG. 1 to FIG. 15.

Figure 1:
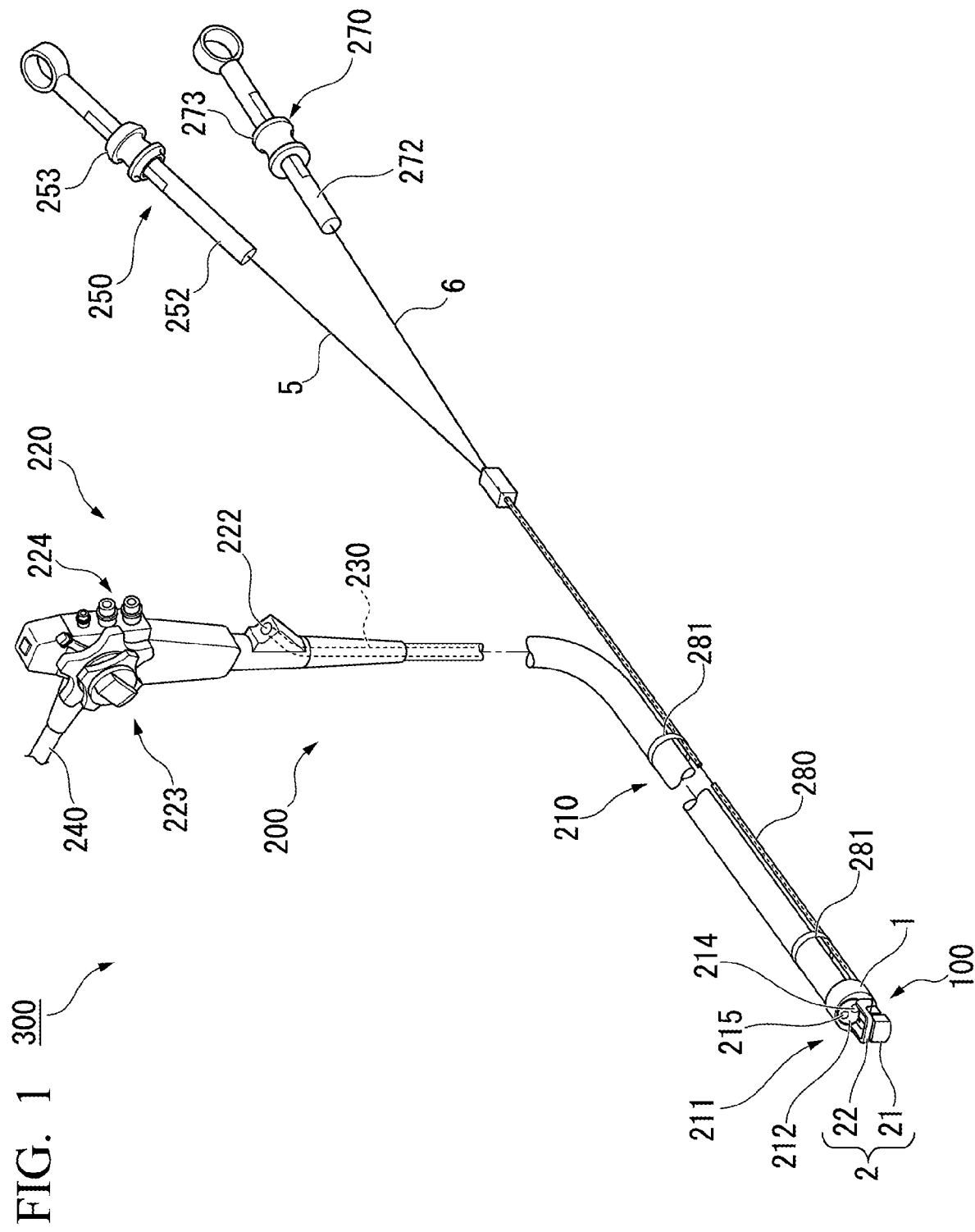
FIG. 1 is a view showing a medical system including a medical stapler according to a first embodiment of the present disclosure.

FIG. 1 is a view showing an overall configuration of a medical system 300 including a medical stapler 100 according to the present embodiment.

[Medical System 300]

The medical system 300 is used in the surgery for suturing the gastrointestinal tract or the like. The medical system 300 includes the medical stapler 100, an endoscope 200, an open-close operation portion 250, an extraction operation portion 270, and a wire sheath 280. The open-close operation portion 250 is an operation portion for operating the medical stapler 100 by an open-close operation wire 5. The extraction operation portion 270 is an operation portion for operating the medical stapler 100 by an extraction operation wire 6.

[Endoscope 200]

The endoscope 200 is a conventional flexible endoscope, and the endoscope 200 includes an elongated insertion portion 210 inserted into the body from a distal end thereof, an operation portion 210 provided in a proximal-end portion of the insertion portion 210, and a universal cord 240.

The insertion portion 210 is formed with a treatment device channel 230 through which the endoscopic treatment device is inserted. At a distal end 212 of the insertion portion 210, a forceps port 214 as a distal-end opening of the treatment device channel 230 is provided. The treatment device channel 230 extends from the distal end 212 of the insertion portion 210 to the operation portion 220.

A distal-end portion 211 of the insertion portion 210 includes an imaging unit (not shown) including a CCD or the like. An objective lens 215 of the imaging unit is exposed from the distal end 212 of the insertion portion 210.

At the proximal-end side of the operation portion 220, a knob 223 for operating the insertion portion 210 and a switch 224 for operating the imaging unit are provided. The surgeon can bend the insertion portion 210 to a desired direction by operating the knob 220.

At the distal-end side of the operation portion 220, a forceps insertion port 222 communicating with the treatment device 230 is provided. The surgeon can insert the endoscopic treatment device into the treatment device channel 230 from the forceps insertion port 222.

The universal cord 240 connects the operation portion 220 and external peripheral devices. For example, the universal cord 240 outputs the images captured by the imaging unit to the external devices. The image captured by the imaging unit is displayed on a display device such as an LCD display or the like.

[Open-Close Operation Portion 250]

The open-close operation portion 250 is an operation portion for opening and closing the medical stapler 100 by operating the open-close operation wire 5. As shown in FIG. 1, the open-close operation portion 250 includes an open-close operation portion main body 252 and an open-close operation slider 253. A proximal end of the open-close operation wire 5 is connected with the open-close operation slider 253. The surgeon can advance and retract the open-close operation wire 5 by advancing and retracting the open-close operation slider 253 with respect to the open-close operation portion main body 252 along the longitudinal direction.

[Extraction Operation Portion 270]

The extraction operation portion 270 is an operation portion for extracting the staple S from the medical stapler 100 by operating the extraction operation wire 6. As shown in FIG. 1, the extraction operation portion 270 includes an extraction operation portion main body 272 and an extraction operation slider 273. A proximal end of the extraction operation wire 6 is connected with the extraction operation slider 273. The surgeon can advance and retract the extraction operation wire 6 by advancing and retracting the extraction operation slider 273 with respect to the extraction operation portion main body 272 along the longitudinal direction.

[Wire Sheath 280]

The wire sheath 280 is a sheath through which the open-close operation wire 5 and the extraction operation wire 6 are inserted. As shown in FIG. 1, the distal-end side of the wire sheath 280 is connected with the insertion portion 210 of the endoscope 200 by a band 281.

[Medical Stapler 100]

Figure 2:
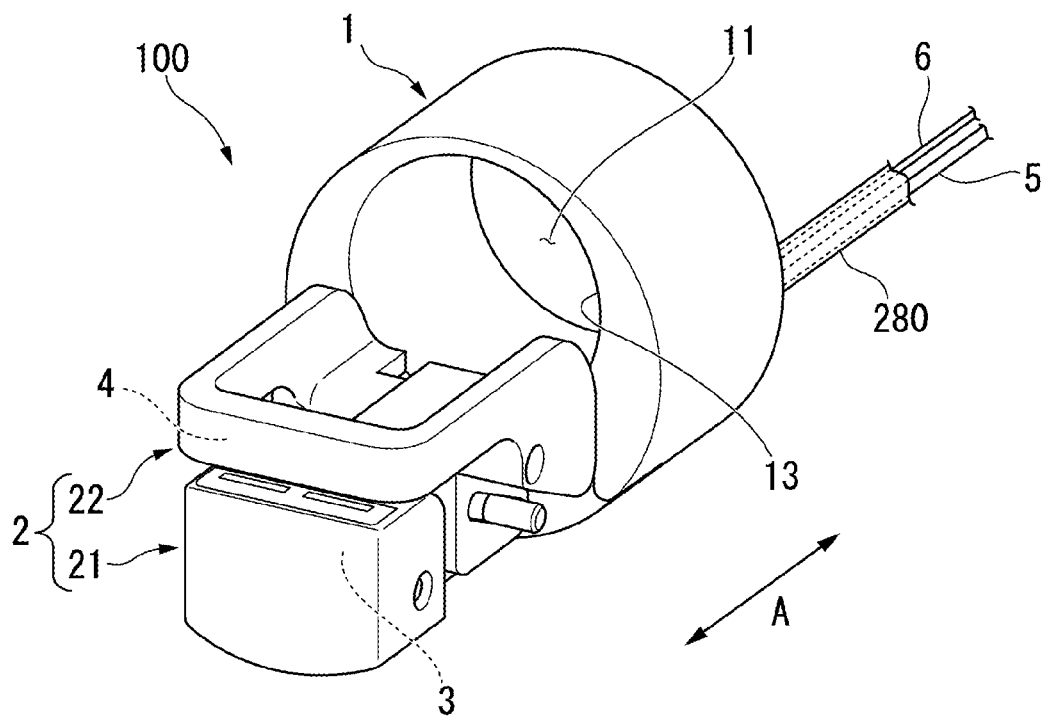
FIG. 2 is a perspective view showing the medical stapler.

FIG. 2 is a perspective view showing the medical stapler 100.

The medical stapler 100 includes a cap 1, a grasping portion 2, a staple extraction portion 3, a staple reception portion 4, the open-close operation wire 5, and the extraction operation wire (power transmission member) 6. The medical stapler 100 is attachable to and detachable from the distal end portion 211 of the insertion portion 210.

Figure 3:
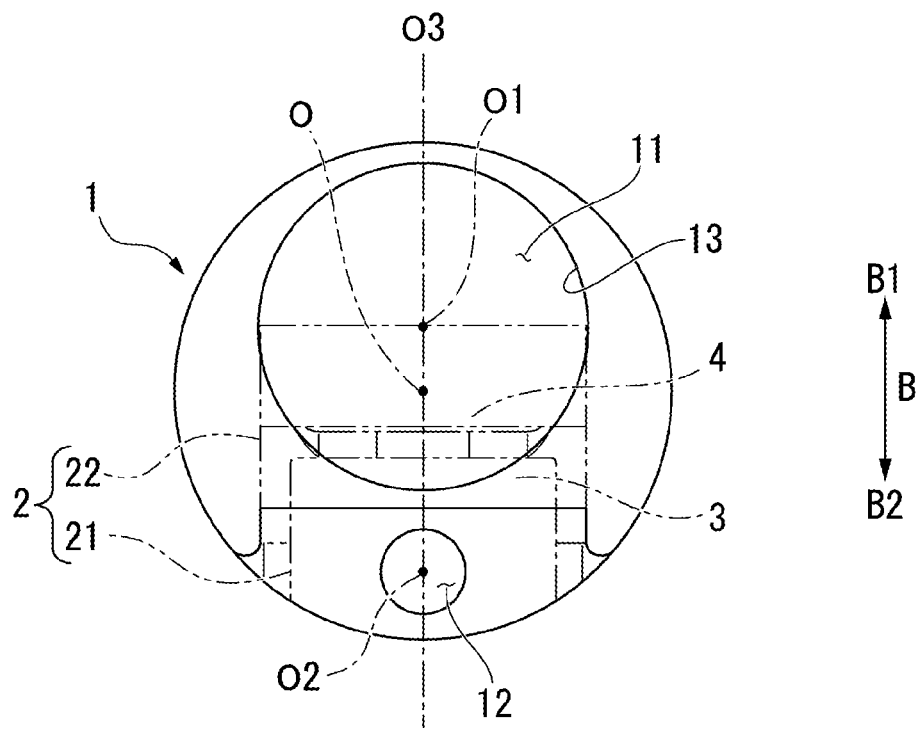
FIG. 3 is a front view showing a cap of the medical stapler.

FIG. 3 is a front view of the cap 1. In FIG. 3, the grasping portion 2 is transparently displayed.

The cap 1 (attachment-detachment portion) is a member that is attachable to the distal-end portion 211 of the endoscope 200. The cap 1 is formed in an approximately cylindrical shape, and the cap 1 has a first penetration hole 11 penetrating in the axial direction A and a second penetration hole 12 penetrating in the axial direction A.

The first penetration hole 11 is a hole in which the distal-end portion 211 of the insertion portion 210 is inserted. The shape of the first penetration hole 11 is formed following the exterior shape of the distal-end portion 211 of the insertion portion 210. Accordingly, the distal-end portion 211 of the endoscope 200 is inserted into the first penetration hole 11 such that the cap 1 can be attached to the distal-end portion 211 of the endoscope 200.

The central axis O1 of the first penetration hole 11 in the axial direction A is eccentrical with respect to the central axis O of the cap 1 in the axial direction A, as shown in FIG. 3. The side in which the central axis O1 is eccentrical with respect to the central axis O is defined as an "upper side B1".

The second penetration hole 12 is a hole for the wire sheath 280 through which the open-close operation wire 5 and the extraction operation wire 6 are inserted to be inserted therein. An inner diameter of the second penetration hole 12 is approximately the same with the outer diameter of the wire sheath 280. The distal-end portion of the wire sheath 280 is inserted through the second penetration hole 12 to be fixed. The open-close operation wire 5 and the extraction operation wire 6 inserting through the wire sheath 280 pass through the second penetration hole 12 to extend to the distal-end side.

As shown in FIG. 3, the central axis O2 of the second penetration hole 12 in the axial direction A is eccentrical with respect to the central axis O of the cap 1 in the axial direction A. The direction in which the central axis O2 is eccentrical with respect to the central axis O is opposite to the side (upper side B1) in which the central axis O1 is eccentrical with respect to the central axis O. The side in which the central axis O2 is eccentrical with respect to the central axis O is defined as a "lower side B2". In the present embodiment, the upper side B1 and the lower side B2 are sides along the up-down direction B.

Figure 4:
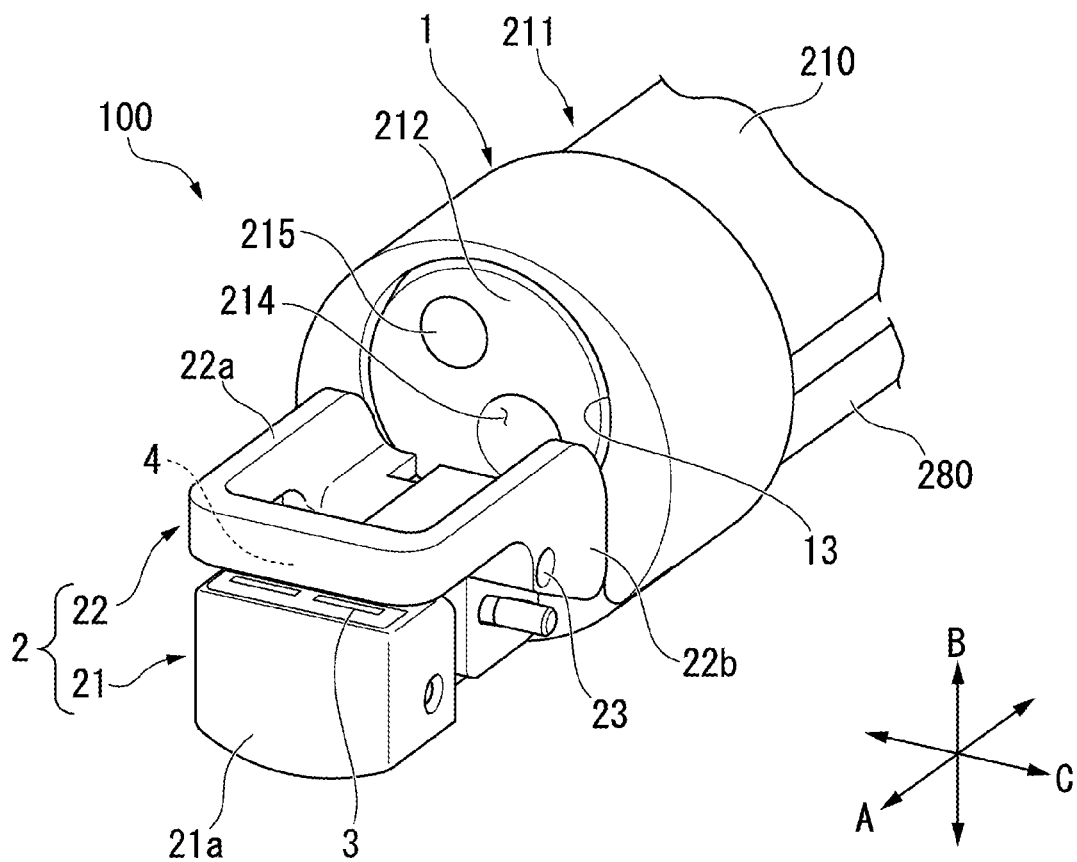
FIG. 4 is a perspective view showing the medical stapler in which a grasping portion is in a closed state.
Figure 5:
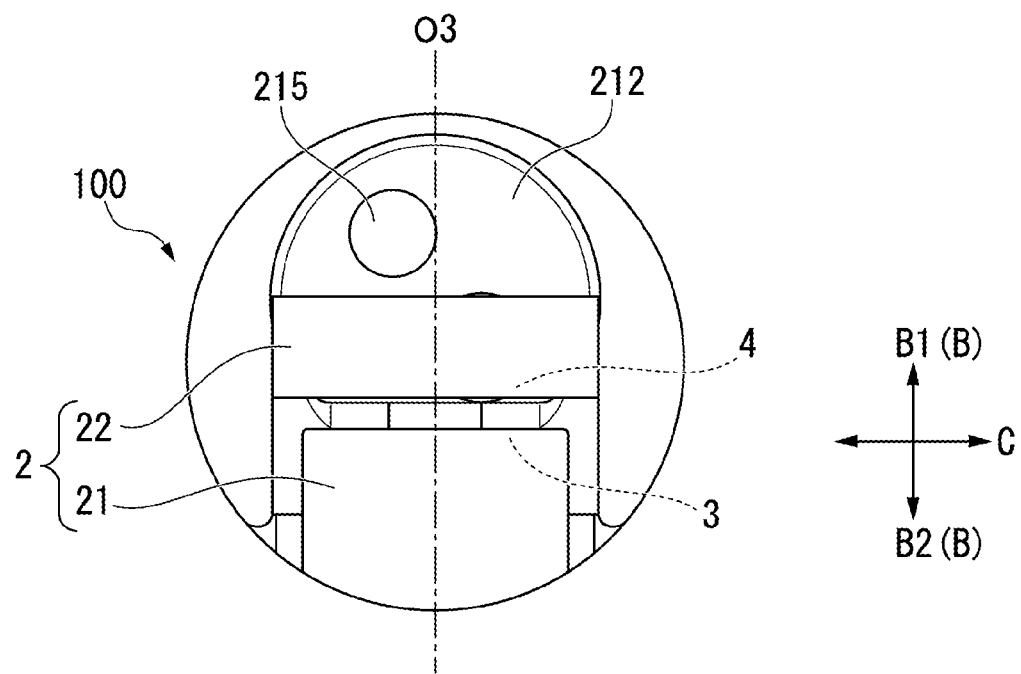
FIG. 5 is a front view showing the medical stapler in which the grasping portion is in the closed state.

FIG. 4 and FIG. 5 are a perspective view and a front view of the medical stapler 100 in which the grasping portion 2 is in the closed state, respectively.

When the cap 1 is attached to the distal-end portion 211 of the endoscope 200, as shown in FIG. 4 and FIG. 5, the objective lens 215 and the forceps port 214 are exposed from the opening 13 at the distal-end side in the first penetration hole 11 of the cap 1. The surgeon can observe the treatment target by the objective lens 215 even if the medical stapler 100 is in the state of being attached to the distal-end portion 211 of the endoscope 200.

Figure 6:
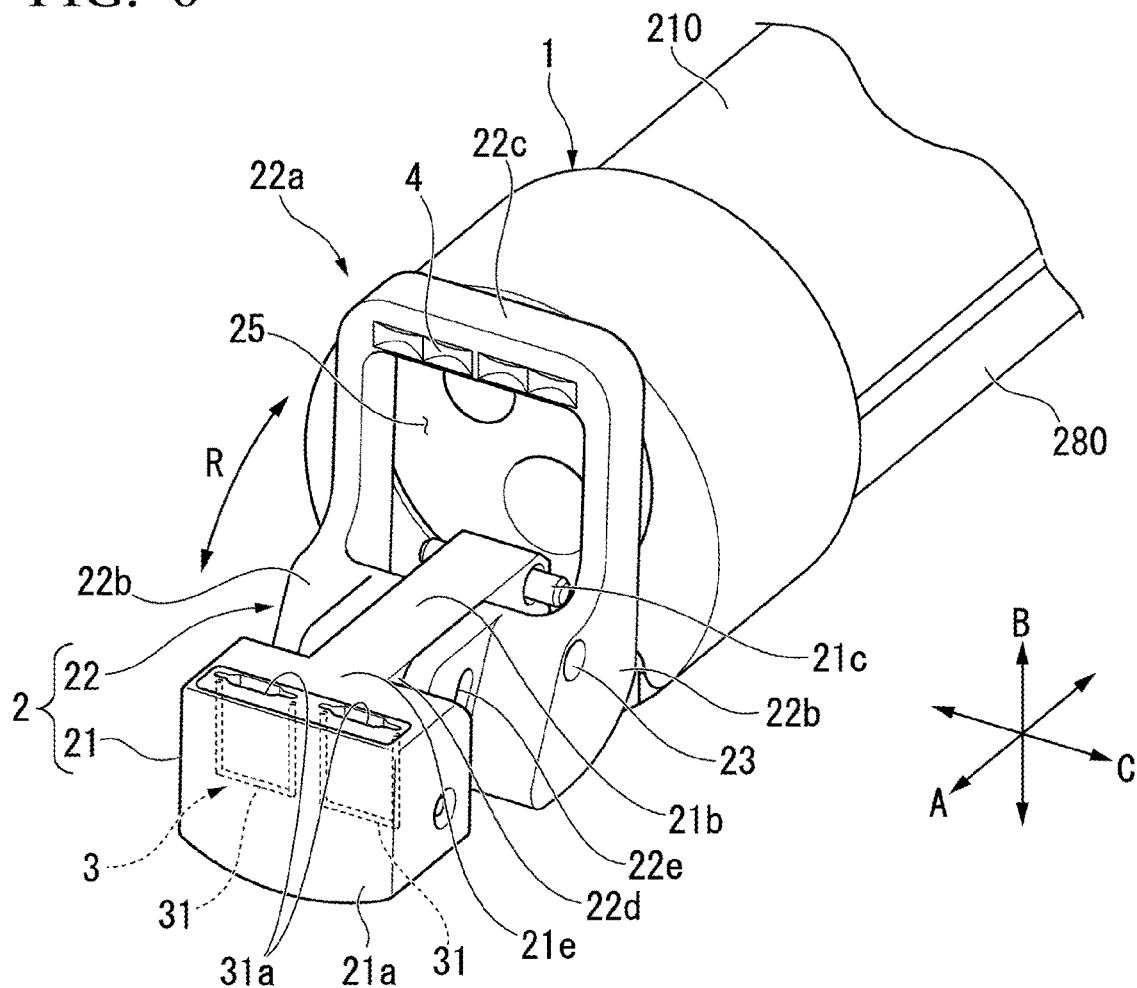
FIG. 6 is a perspective view showing the medical stapler in which the grasping portion is in an open state.
Figure 7:
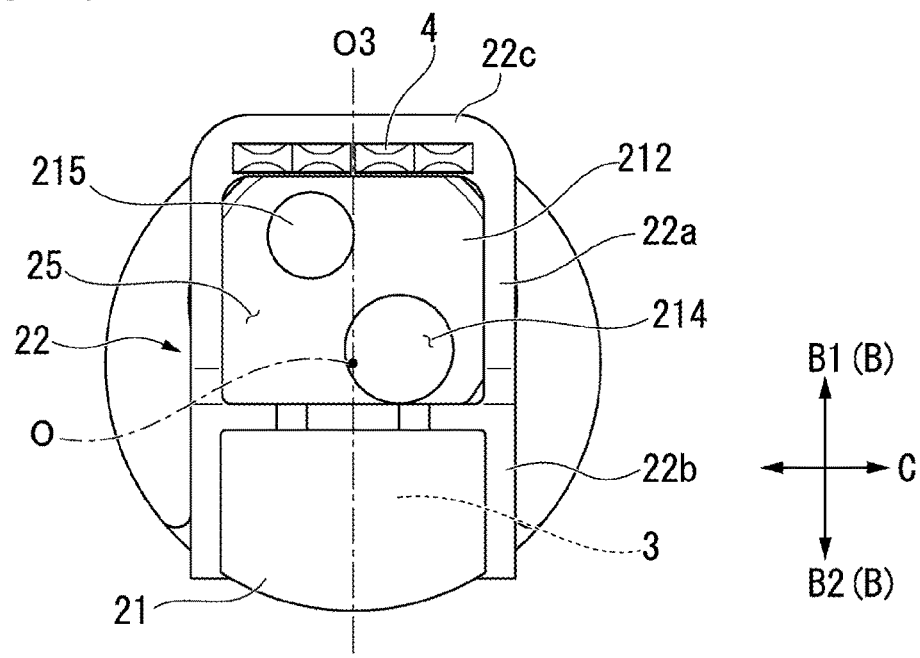
FIG. 7 is a perspective view showing the medical stapler in which the grasping portion is in the open state.
Figure 8:
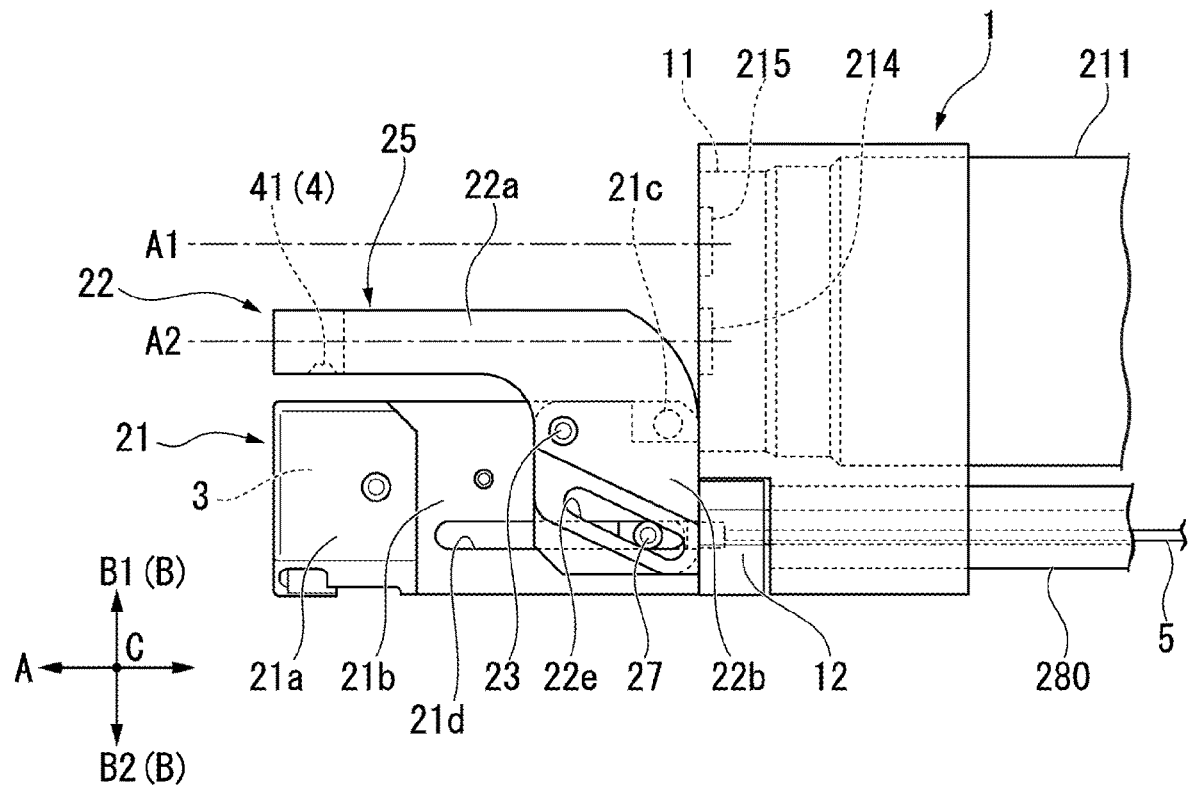
Figure 9:
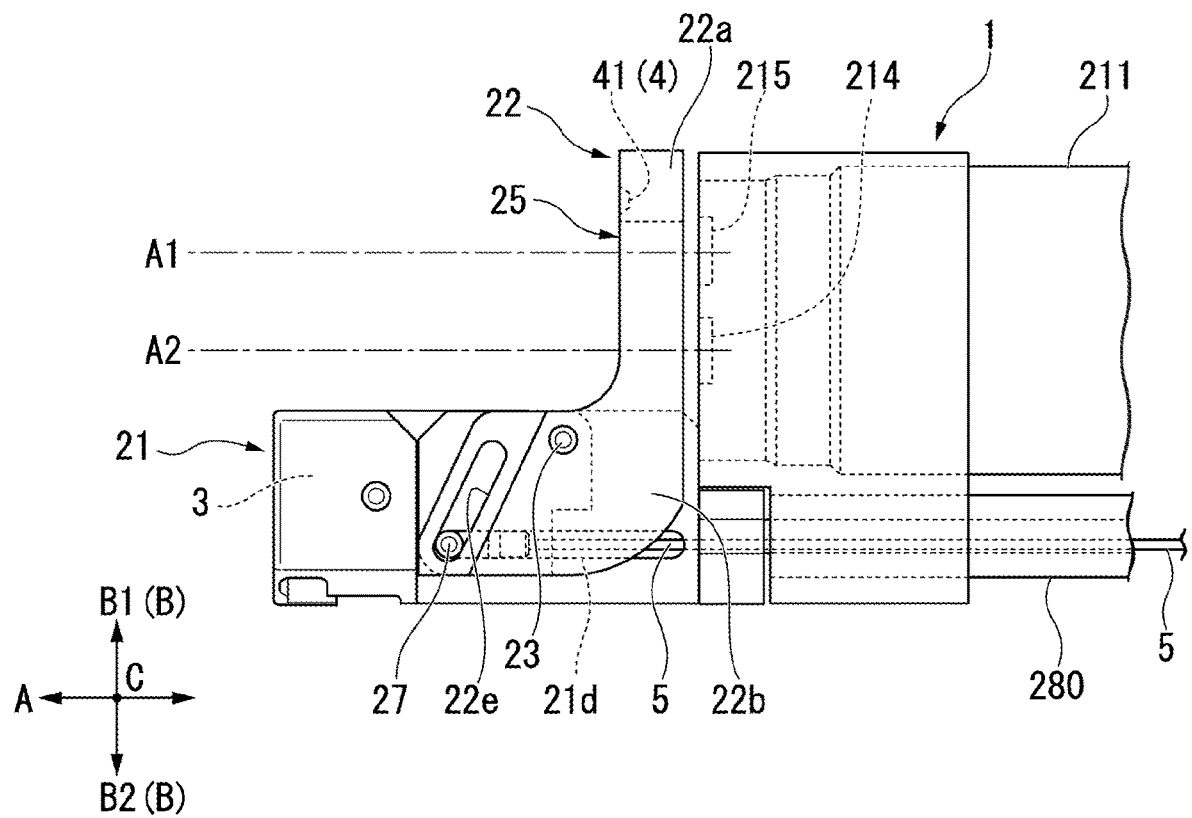
FIG. 9 is a side view showing the medical stapler in which the grasping portion is in the open state.

FIG. 6 and FIG. 7 are a perspective view and a front view of the medical stapler 100 in which the grasping portion 2 is in the open state, respectively. Furthermore, FIG. 8 is a side view of the medical stapler 100 in which the grasping portion 2 is in the closed state. FIG. 9 is a side view of the medical stapler 100 in which the grasping portion 2 is in the open state.

The grasping portion 2 includes a first grasping member 21, a second grasping member 22, an open-close rotation shaft 23, and a movable pin 27. The first grasping member 21 and the second grasping member 22 are connected by the open-close rotation shaft 23 to be openable and closeable. The open-close rotation shaft 23 is provided at the distal-end side of the cap 1. The axial direction C of the open-close rotation shaft 23 is orthogonal to the axial direction A of the cap 1 and the up-down direction B. As shown in FIG. 7, the grasping portion 2 is formed to be symmetrical with respect to the central axis O3 in the up-down direction B.

The first grasping member 21 is fixed to the distal-end side of the cap 1 to be not rotatable. The first grasping member 21 is fixed to the cap 1 at the lower side B2 than the central axis O of the cap 1. As shown in FIG. 3, the first grasping member 21 is arranged at the position overlapping the second penetration hole 12 in the front view. On the other hand, as shown in FIG. 7, the first grasping member 21 is arranged at the position not to overlap the objective lens 215 and the forceps port 214 in the front view.

As shown in FIG. 6, the first grasping member 21 includes a first distal-end portion 21a and a first main body portion 21b, and the first grasping member 21 is formed in an approximately T-shape in a planar view. The first distal-end portion 21a is arranged at the distal-end side than the first main body portion 21b.

The first distal-end portion 21a is formed in a substantially rectangular parallelepiped shape. The first distal-end portion 21a is formed in a rectangular shape extending in the axial direction C of the open-close rotation shaft 23 in the planar view. The staple extraction portion 3 is provided in the first distal-end portion 21a. The opening 31a of the staple extraction portion 3 is provided on the surface (upper surface 21e) at the upper side B1 of the first distal-end portion 21a.

The first main body portion 21b is an elongated member extending in the axial direction A. The distal end of the first main body portion 21b is fixed to the first distal-end portion 21a. The proximal end of the first main body portion 21b is fixed to the cap 1. The first main body portion 21b includes an abutting pin 21c and a first engagement groove 21d.

The abutting pin 21c is provided at the proximal end of the first main body portion 21b, and the abutting pin 21c is configured to abut to the second grasping member 22 in the closed state to regulate the movable range of the second grasping member 22.

The first engagement groove 21d shown in FIG. 8 is a groove penetrating in the axial direction C of the open-close rotation shaft 23 in the first main body portion 21b. The first engagement groove 21d extends in the axial direction A.

The second grasping member 22 is attached to the first grasping member 21 by the open-close rotation shaft 23 to be rotatable. The second grasping member 22 includes a U-shaped member 22a substantially formed in the U-shape and a second main body portion 22b to rotatably support the U-shaped member 22a.

The U-shaped member 22a is formed in the substantially U-shape, wherein two end portions thereof are connected with the second main body portion 22b, and the central portion thereof is disposed at the distal-end side. The central portion includes the second distal-end portion 22c. The second distal-end portion 22c is formed in a substantially rectangular parallelepiped shape. The staple reception portion 4 is arranged in the second distal-end portion 22c.

The second main body portion 22b is attached to the first main body portion 21b of the first grasping member 21 by the open-close rotation shaft 23 to be rotatable. The guide groove 22d into which the first main body portion 21b is inserted is formed in the second main body portion 22b. The second engagement groove 22e is formed in two side portions of the guide groove 22d of the second main body portion 22b.

The second engagement groove 22e is the groove formed in the second main body portion 22b. The second engagement groove 22e is the groove penetrating in the axial direction C. In the side view, the second engagement groove 22e is formed in the opposite side with respect to the staple reception portion 4 to sandwich the open-close rotation shaft 23. The second engagement groove 22e is symmetrical with respect to the central axis O3 of the second grasping member 22.

As shown in FIG. 6, the second grasping member 22 includes visual-field space 25 between the staple reception portion 4 at the distal-end side and the open-close rotation shaft 23 at the proximal-end side and penetrating in the open-close direction R. In the present embodiment, the visual-field space 25 is the space being surrounded by the U-shaped member 22a that is substantially formed in the U-shape.

The movable pin 27 is engaged with the first engagement groove 21d and the second engagement groove 22e, and the movable pin 27 advances and retracts in the axial direction A along the first engagement groove 21d. The distal end of the open-close operation wire 5 is attached to the movable pin 27. As shown in FIG. 9, when the open-close operation wire 5 moves to the distal-end side, the movable pin 27 rotates the second grasping member 22 about the open-close rotation shaft 23 as the rotation center such that the grasping portion 2 enters the open state. As shown in FIG. 8, when the open-close operation wire 5 retracts to the proximal-end side, the movable pin 27 rotates the second grasping member 22 about the open-close rotation shaft 23 as the rotation center such that the grasping portion 2 enters the closed state.

As shown in FIG. 5, when the grasping portion 2 is in the closed state, the staple extraction portion 3 and the staple reception portion 4 are opposite to each other. When the grasping portion 2 is in the closed state, a slightly narrow gap is formed between the staple extraction portion 3 and the staple reception portion 4. As shown in FIG. 4, FIG. 5, and FIG. 8, when the grasping portion 2 is in the closed state, the optical axis A1 of the objective lens 215 passes through the outside of the first grasping member 21 and the second grasping member 22. Also, when the grasping portion 2 is in the closed state, the central axis A2 of the forceps port 214 does not overlap the first grasping member 21 in the front view; however, the central axis A2 of the forceps port 214 is at the position overlapping the second grasping member 22.

As shown in FIG. 9, when the grasping member 2 is in the open state, the staple reception portion 4 is disposed at the proximal-end side than the open-close rotation shaft 23. As shown in FIG. 6, FIG. 7, and FIG. 9, when the grasping portion 2 is in the open state, the staple extraction portion 3 and the staple reception portion 4 are arranged at two sides of the optical axis A1 of the objective lens 215 to sandwich the optical axis A1 of the objective lens 215. When the grasping portion 2 is in the open state, the optical axis A1 of the objective lens 215 passes through the visual-field space 25. Also, when the grasping portion 2 is in the open state, the central axis A2 of the forceps port 214 passes through the visual-field space 25.

Figure 10:
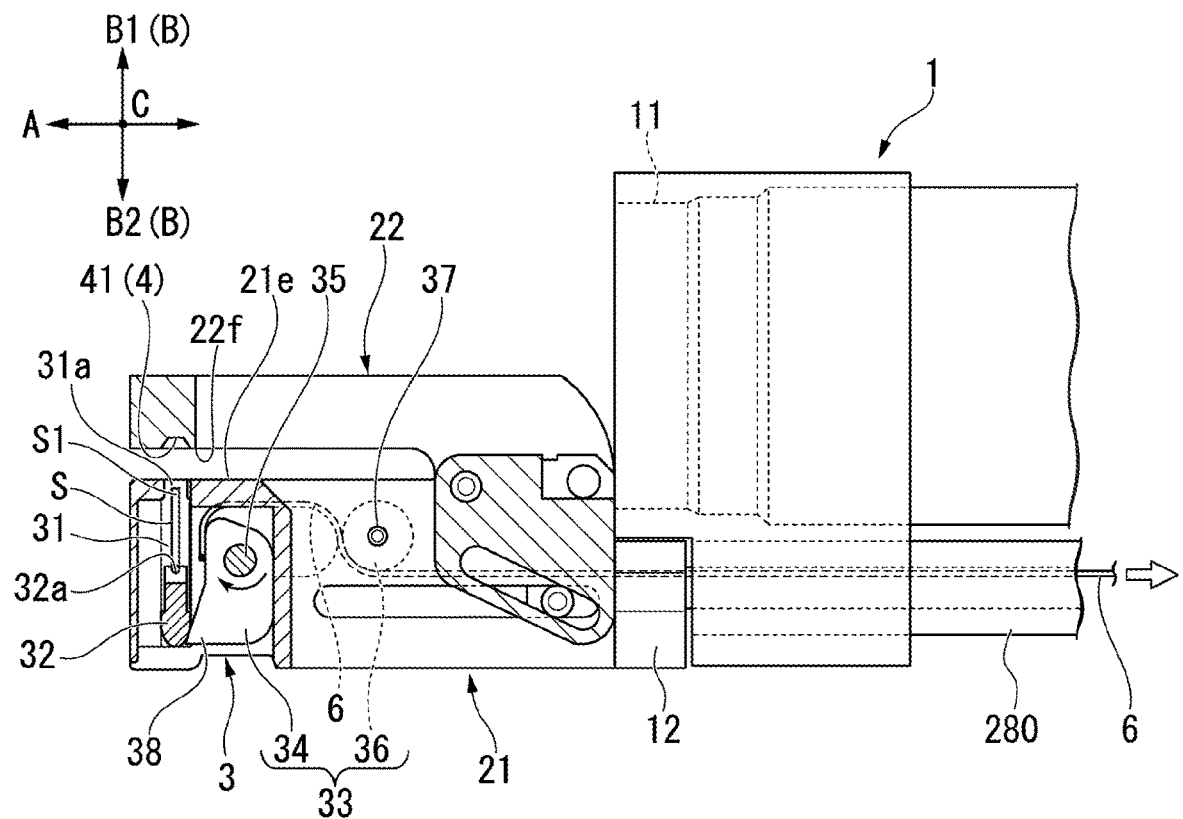
FIG. 10 is a cross-sectional view showing the grasping portion including a staple extraction portion.

FIG. 10 is a cross-sectional view showing the grasping portion 2 including the staple extraction portion 3.

The staple extraction portion 3 is arranged in the first distal-end portion 21a of the first grasping member 21 and configured to accommodate and extract the staples S. The staple extraction portion 3 includes a staple accommodation portion 31, a straight-moving member 32, and a rotation member 33.

The staple accommodation portion 31 is the space provided in the first distal-end portion 21a of the first grasping member 21 for accommodating the staples S. As shown in FIG. 6, two of the staple accommodation portions 31 are formed side by side in the axial direction C in the first grasping member 21 so as to be able to accommodate two of the U-shaped staples S.

The staple accommodation portion 31 has the opening 31a provided on the upper surface 21e of the first distal-end portion 21a to open in the up-down direction B. The staples S are accommodated in the staple accommodation portion 31 from the opening 31a. The staples S are accommodated in the staple accommodation portion 31 in the state in which the needle tip S1 of the staple S is directed toward the upper side B1.

In the planar view, the staple accommodation portion 31 is formed in a rectangular shape that the short side extends in the axial direction A and the long side extends in the axial direction C. The staples S accommodated in the staple accommodation portion 31 are arranged that the needle tips S1 at two ends thereof are arrayed in the axial direction C.

The straight-moving member 32 is the member accommodated in the staple accommodation portion 31 and movable in the inside space of the staple accommodation portion 31 along the up-down direction B. The straight-moving member 32 includes the concave portion 32a at the upper side B1 to support the staple S. The staple S accommodated in the staple accommodation portion 31 is fitted into the concave portion 32a.

A first pulley 34 and a second pulley 36 as the rotation member 33 are attached to the inside of the first grasping member 21 to be rotatable, and the first pulley 34 and the second pulley 36 rotate so as to move the straight-moving member 32 in the up-down direction B. The distal-end of the extraction operation wire 6 is connected to the first pulley 34. It is possible to rotate the first pulley 34 by pulling the extraction operation wire 6.

The second pulley 36 is attached to the inside of the first grasping member 21 to be rotatable, and the first pulley 34 is disposed at the distal-end side of the second pulley 36. The rotation axis 35 of the first pulley 34 and the rotation axis 37 of the second pulley 36 extend in the axial direction C and substantially parallel to the open-close shaft 23 of the grasping portion 2. The first pulley 34 includes the convex portion (contact portion) 38 at the distal-end side to support the straight-moving member 32 from the lower side B2.

The distal end of the extraction operation wire 6 is connected to the first pulley 34 at the position at the upper side B1 than the rotation axis 35. The extraction operation wire 6 passes through the second penetration hole 12 from the first pulley 34 via the second pulley 36 to extend to the extraction operation portion 270. The reason for providing the second pulley 36 is to suitably perform the position adjustment for guiding the extraction operation wire 6 to the second penetration hole 12 and reduce the friction resistance at the time of guiding the extraction operation wire 6 to the second penetration hole 12. Accordingly, the same effect can be achieved by using the first pulley 34 only as the rotation member 33 and providing a member (friction-reduction member) in a R-shape and with a suitable slidability instead of the second pulley 36.

Figure 11:
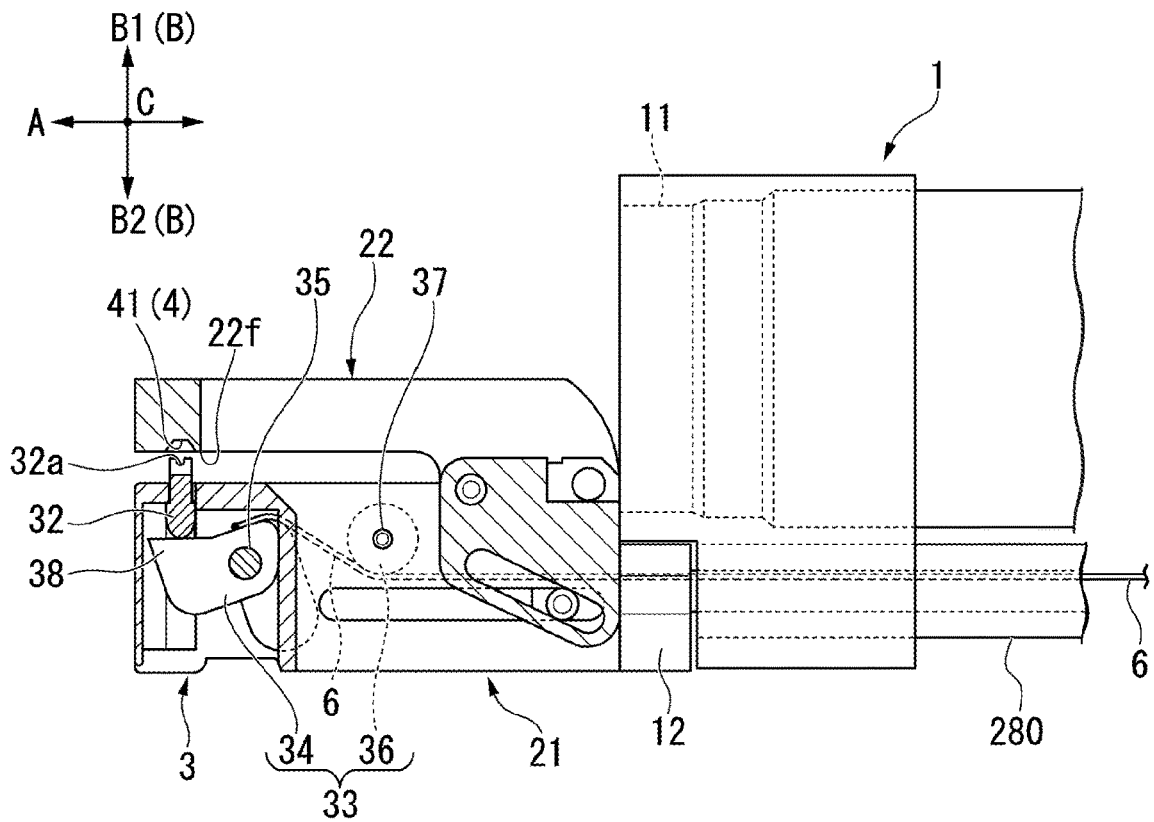
FIG. 11 is a cross-sectional view showing the grasping portion in which an extraction operation wire is pulled.

FIG. 11 is a cross-sectional view showing the grasping portion 2 in which the extraction operation wire 6 is pulled.

By pulling the extraction operation wire 6, the portion at the upper-side B1 of the first pulley 34 rotates to the proximal-end side, and the portion at the lower-side B2 of the first pulley 34 rotates to the distal-end side. As a result, the convex portion 38 of the first pulley 34 pushes up the straight-moving member 32 to the upper-side B1 to extract the accommodated staple S to the upper-side b1 from the opening 31a.

The staple reception portion 4 is provided on the lower surface 22f of the second distal-end portion 22c of the second grasping member 22. The staple reception portion 4 is provided with a plurality of pockets 41 being capable of accommodating the staples extracted from the staple extraction portion 3. In the present embodiment, two of the U-shaped staples are extracted from the staple extraction portion 3 such that there are four pockets 41 being provided in the staple reception portion 4. As shown in FIG. 10, when the grasping portion 2 is in the closed state, the opening 31a from which the staple S is extracted and the pocket 41 of the staple extraction portion 3 are opposite to each other.

[Operations of Medical Stapler 100]

Next, the operations of the medical stapler 100 will be described. FIG. 12 to FIG. 15 are views for describing the operations of the medical stapler 100.

Figure 12:
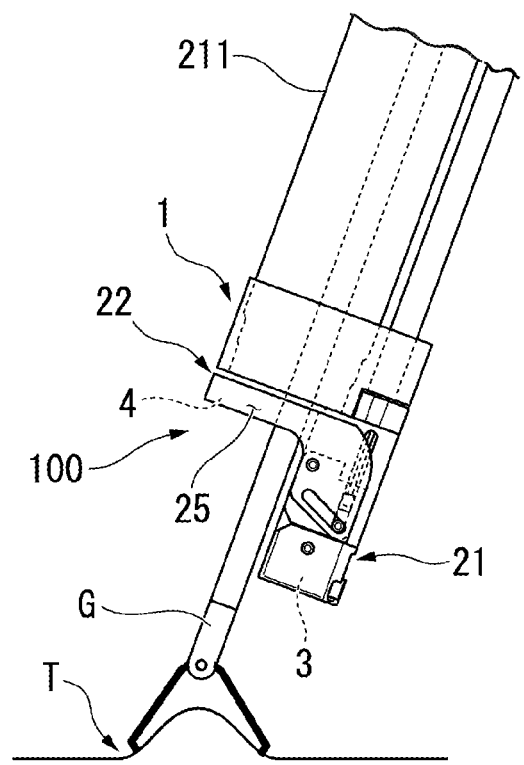
FIG. 12 is a view describing operations of the medical stapler.

The surgeon moves the distal-end portion 211 of the endoscope 200 to which the medical stapler 100 is attached to approach the treatment target T. The surgeon operates the open-close operation portion 250 to advance the open-close operation wire 5 to make the grasping portion 2 into the open state. The optical axis A1 of the objective lens 215 passes through the visual-field space 25 such that the surgeon can observe the treatment target T through the imaging unit of the endoscope 200. Also, the central axis A2 of the forceps port 214 passes through the visual-field space 25 such that as shown in FIG. 12, the surgeon can protrude the grasping forceps G from the forceps port 214 to perform the treatment with respect to the treatment target T.

Figure 13:
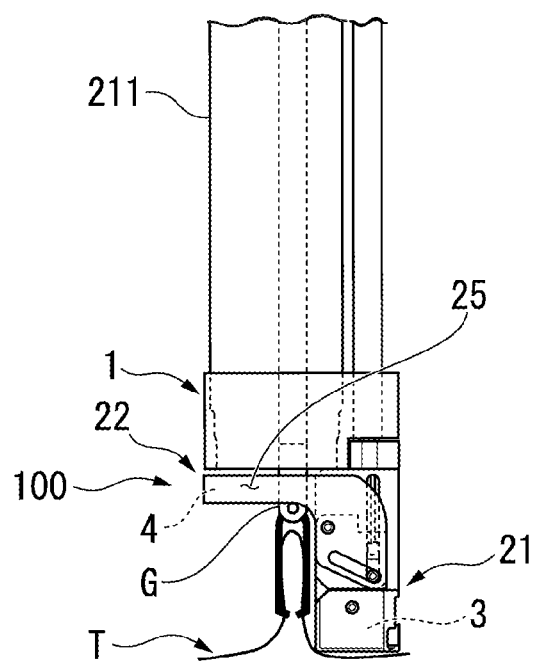
FIG. 13 is a view describing the operations of the medical stapler.

As shown in FIG. 13, the surgeon retracts the grasping forceps G in the state of grasping the treatment target T by the grasping forceps G. The surgeon retracts the grasping forceps G so as to dispose the distal end of the grasping forceps G at the proximal-end side than the staple extraction portion 3.

Figure 14:
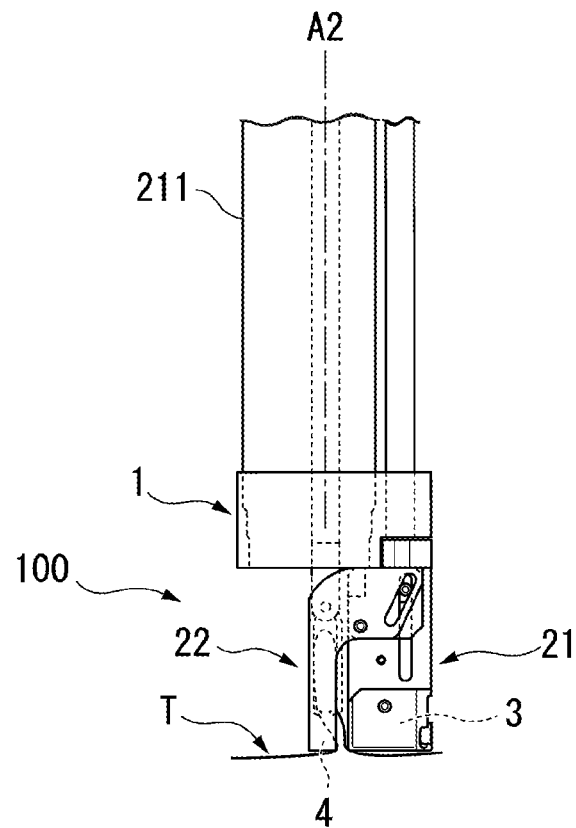
FIG. 14 is a view describing the operations of the medical stapler.

As shown in FIG. 14, the surgeon operates the open-close operation portion 250 to retract the open-close operation wire 5 to cause the grasping portion 2 in the closed state. The treatment target T is clamped by the staple extraction portion 3 of the first grasping member 21 and the staple reception portion 4 of the second grasping member 22.

When the grasping portion 2 is in the closed state, part of the treatment target T that is clamped by the grasping forceps G can be accommodated in the space (visual-field space 25) formed by the U-shaped member 22a and the second main body portion 22b of the second grasping member 22 such that it is difficult for the treatment target T that is clamped by the staple extraction portion 3 and the staple reception portion 4 to escape.

As shown in FIG. 8, when the grasping portion 2 is in the closed state, the optical axis A1 of the objective lens 215 passes through the outside of the first grasping member 21 and the second grasping member 22. Accordingly, it is also possible for the surgeon to observe the treatment target T through the imaging unit of the endoscope 200 even when the grasping portion 2 is in the closed state.

The surgeon operates the extraction operation portion 270 to pull the extraction operation wire 6 in the state in which the treatment target T is clamped by the staple extraction portion 3 and the staple reception portion 4 to extract the accommodated staples S toward the staple reception portion 4. The needle tips S1 of the staple S penetrate the treatment target T to come into contact with the pocket 41 of the staple reception portion 4 to be bent. As a result, the treatment target T is sutured.

Figure 15:
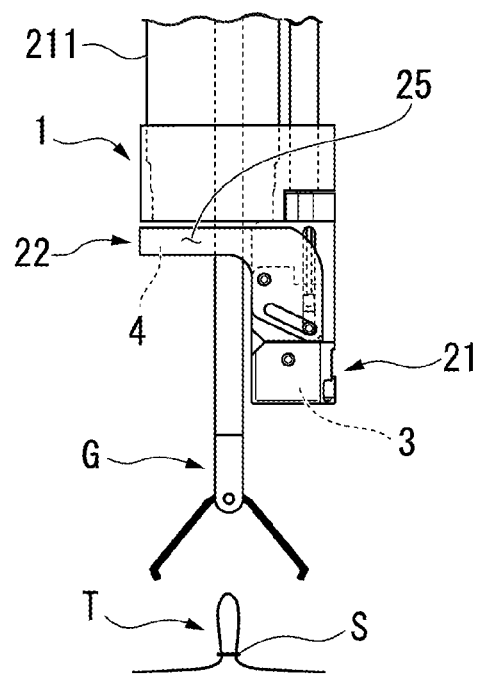
FIG. 15 is a view describing the operations of the medical stapler.

As shown in FIG. 15, the surgeon operates the open-close operation portion 250 to make the grasping portion 2 into the open state again. The surgeon separates the grasping forceps G from the treatment target T to finish the suturing treatment.

According to the medical stapler 100 disclosed in the present embodiment, the insertion diameter of the medical stapler 100 in which the grasping portion 2 is in the closed state is substantially the same with that of the distal-end portion 211 of the endoscope 200 such that it is easy to be inserted into the body such as the gastrointestinal tract or the like. Also, even the grasping portion 2 of the medical stapler 100 is in the open state, the surgeon can observe the treatment target T via the imaging unit of the endoscope 200 and protrude the grasping forceps G from the forceps port 214 to perform the treatment with respect to the treatment target T.

As described above, the first embodiment of the present disclosure has been described in detail with reference to the drawings, however, the specific configuration is not limited to the present embodiment, and design changes and the like are included within the scope of the present invention. Also, the configuration elements shown in the above-described embodiment and modification examples can be combined as appropriate.

Second Embodiment

A second embodiment of the present disclosure will be described with reference to FIG. 16. In the following description, the same reference signs will be given to the common configurations as those already described, and the redundant descriptions will be omitted. A medical stapler 100B according to the second embodiment is different from the medical stapler 100 according to the first embodiment in the attachment target to which the medical stapler 100B is attached.

Figure 16:
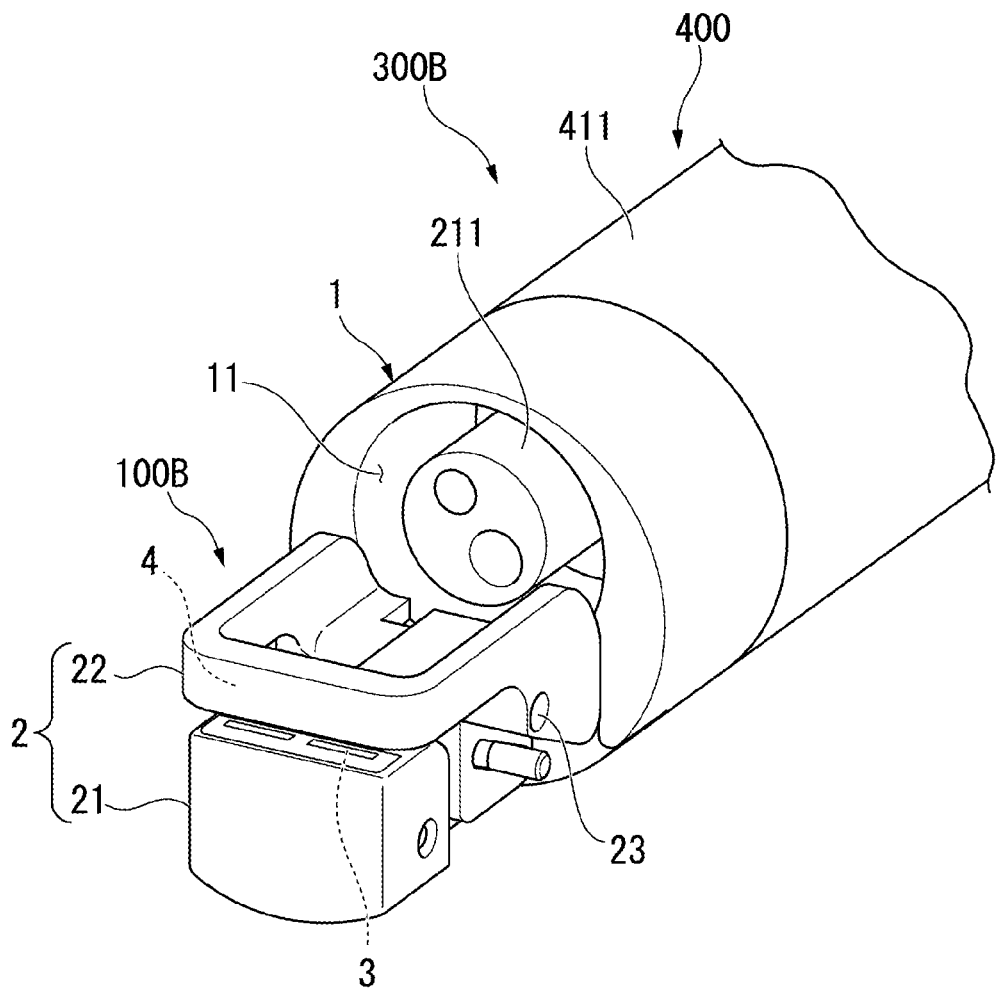
FIG. 16 is a view showing a medical system including a medical stapler according to a second embodiment of the present disclosure.

FIG. 16 is a view showing a medical system 300B being used by attaching the medical stapler 100B to a distal-end portion 411 of an overtube 400. The medical system 300B is used in the surgery for suturing the gastrointestinal tract or the like. The medical system 300B includes the medical stapler 100B, the endoscope 200, the open-close operation portion 250, the extraction operation portion 270, the wire sheath 280, and the overtube 400.

Similar to the medical stapler 100 according to the first embodiment, the medical stapler 100B attached to the distal-end portion 411 of the overtube 400 includes the cap (attachment-detachment portion) 1, the grasping portion 2, the staple extraction portion 3, the staple reception portion 4, the open-close operation wire 5, and the extraction operation wire (power transmission member) 6.

The inside space of the overtube 400 communicates with the first penetration hole 11 of the cap (attachment-detachment portion) 1. It is possible for the surgeon to insert the endoscope 200 into the inside space of the overtube 400 to expose the distal end 212 of the endoscope 200 from the first penetration hole 11.

The cap (attachment-detachment portion) 1 of the medical stapler 100B may be integrally molded with the distal-end portion 411 of the overtube 400.

According to the medical stapler 100B disclosed in the present embodiment, the insertion diameter of the medical stapler 100B in which the grasping portion 2 is in the closed state is substantially the same with that of the distal-end portion 411 of the overtube 400 such that it is easy to be inserted into the body such as the gastrointestinal tract or the like. Also, even the grasping portion 2 of the medical stapler 100B is in the open state, the surgeon can observe the treatment target T via the imaging unit of the endoscope 200 and protrude the grasping forceps G from the forceps port 214 to perform the treatment with respect to the treatment target T.

As described above, the second embodiment of the present disclosure has been described in detail with reference to the drawings, however, the specific configuration is not limited to the present embodiment, and design changes and the like are included within the scope of the present invention. Also, the configuration elements shown in the above-described embodiment and modification examples can be combined as appropriate.

Modification Example 1

Figure 17:
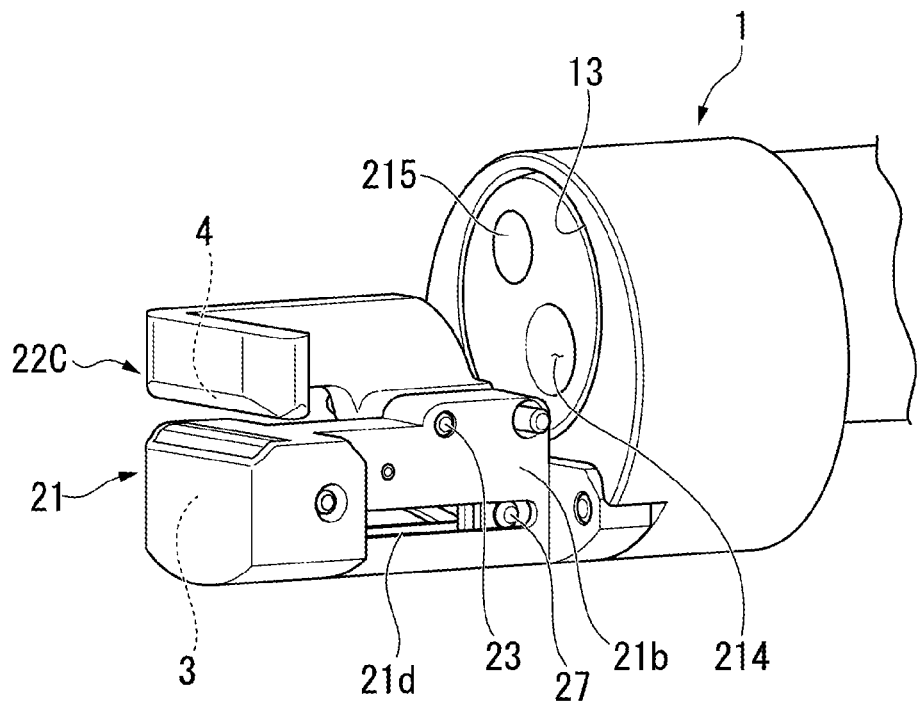
FIG. 17 is a perspective view showing a modification example of a second grasping member.
Figure 18:
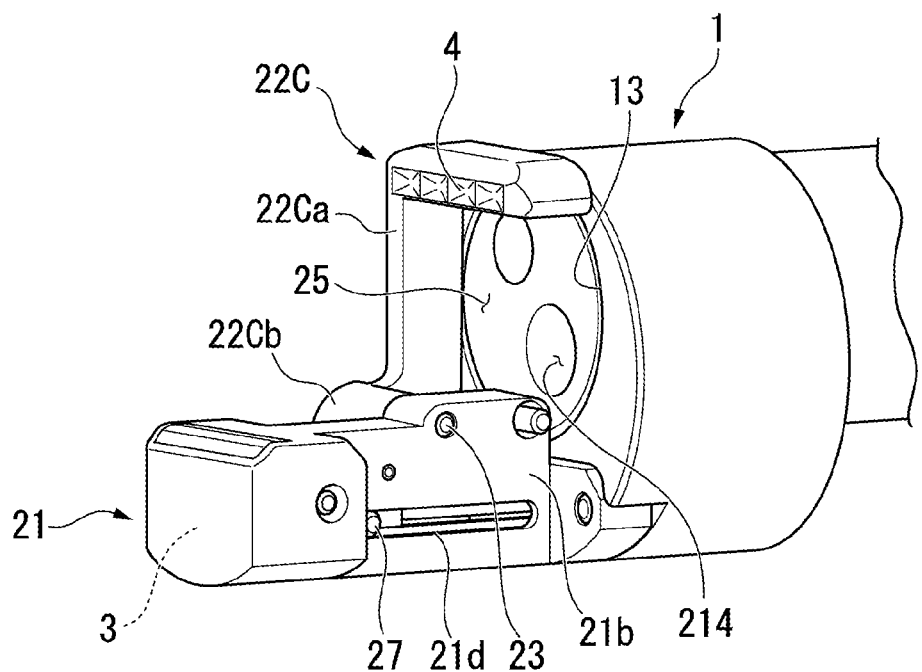
FIG. 18 is a perspective view showing a modification example of the second grasping member.

For example, in the above-described embodiment, the visual-field space 25 that is surrounded by the U-shaped member 22a formed in the substantially U-shape is formed in the second grasping member 22; however, the aspect of the second grasping member 22 is not limited to the configuration. FIG. 17 and FIG. 18 are perspective views showing a second grasping member 22C as a modification example of the second grasping member 22. The second grasping member 22C includes an L-shaped member 22Ca that is formed in a substantially L-shape and a second main body portion 22Cb configured to rotatably support the L-shaped member 22Ca. The staple reception portion 4 is provided at the distal end of the L-shaped member 22Ca. The proximal end of the L-shaped member 22Ca is attached to the second main body portion 22Cb. In this case, the visual-field space 25 is the space being sandwiched by the sides of the L-shaped member 22Ca formed in the substantially L-shape. As shown in FIG. 18, even if the second grasping member 22C is in the open state, the surgeon can observe the treatment target T through the imaging unit of the endoscope 200 and protrude the grasping forceps G from the forceps port 214 to perform the treatment with respect to the treatment target T.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. For example, the configuration according to any one of above-described embodiments and modifications of the present disclosure may be appropriately combined with each modification of the operation section. The present disclosure is not limited by the above description, but only by the appended claims.

What is claimed is:
1. A medical stapler, comprising:
   an attachment configured to be attached to a distal-end portion of an endoscope and including an opening configured to expose an objective lens of the endoscope; and
   a grasping portion attached to the attachment and including a first grasping portion and a second grasping portion connected by a rotation shaft and the second grasping portion is configured to open and close with respect to the first grasping portion,
   wherein a staple extraction portion provided in the first grasping portion and a staple reception portion provided in the second grasping portion are opposite to each other when the grasping portion is in a closed state,
   wherein a distal end of the attachment is configured to locate more distally than the distal-end portion of an endoscope in a state that the attachment is attached to the endoscope,
   wherein when the grasping portion is in an open state, the staple reception portion is arranged between the distal end of the attachment and the rotation shaft in a longitudinal axis of the attachment.

2. The medical stapler according to claim 1, wherein when the grasping portion is in the closed state, an outside of the first grasping portion and the second grasping portion are configured to allow an optical axis of the objective lens to pass therethrough.

3. The medical stapler according to claim 1, wherein when the grasping portion is in the open state, the staple extraction portion and the staple reception portion are configured to be arranged at two sides of an optical axis of the objective lens to sandwich the optical axis therebetween.

4. The medical stapler according to claim 1,
wherein the opening of the attachment is configured to expose a forceps port of the endoscope, and
when the grasping portion is in the open state, a visual-field space is configured to allow a central axis of the forceps port to pass therethrough.

5. The medical stapler according to claim 1, wherein a visual-field space is a penetration hole formed in the second grasping portion.

6. The medical stapler according to claim 1,
wherein the first grasping portion is fixed to the attachment to not be rotatable, and
the second grasping portion is attached to the first grasping portion by the rotation shaft to be rotatable.

7. The medical stapler according to claim 6, wherein when the grasping portion is in the open state, the staple reception portion is arranged at a proximal-end side with respect to the rotation shaft.

8. The medical stapler according to claim 6,
wherein the second grasping portion includes a U-shaped member formed in a U shape, and
a visual-field space is an area being surrounded by sides of the U-shaped member.

9. The medical stapler according to claim 6,
wherein the second grasping portion includes an L-shaped member formed in an L shape, and
a visual-field space is an area being sandwiched by sides of the L-shaped member.

10. A medical system, comprising:
the medical stapler according to claim 1, and
the endoscope.

11. The medical stapler according to claim 1,
wherein the second grasping portion includes a visual-field space penetrating a gap between the staple reception portion and the rotation shaft in an open-close direction,
when the grasping portion is in the closed state, the staple extraction portion and the staple reception portion are opposite to each other, and
when the grasping portion is in the open state, the visual-field space is configured to allow an optical axis of the objective lens to pass through.

12. The medical stapler according to claim 1,
wherein the rotation shaft is arranged between the distal end of the attachment and the staple extraction portion in the longitudinal axis, and the attachment is attached to the endoscope with a longitudinal axis of the rotation shaft perpendicular to an optical axis.

13. The medical stapler according to claim 1,
wherein the staple reception portion is provided with at least a pocket being configured to accommodate staples, and when the grasping portion is in the open state, an opening direction of the pocket coincides with a direction of an optical axis.

* * * * *